US008136780B2

(12) United States Patent
Lin

(10) Patent No.: US 8,136,780 B2
(45) Date of Patent: Mar. 20, 2012

(54) AUXILIARY SECURELY HOLDING DEVICE FOR ELECTRONIC APPLIANCE

(75) Inventor: Chung-Hung Lin, Tainan County (TW)

(73) Assignee: Jow Tong Technology Co., Ltd., Tainan Hsien (TW)

( * ) Notice: Subject to any disclaimer, the term of this patent is extended or adjusted under 35 U.S.C. 154(b) by 0 days.

(21) Appl. No.: 12/787,607

(22) Filed: May 26, 2010

(65) Prior Publication Data

US 2011/0290975 A1   Dec. 1, 2011

(51) Int. Cl.
*A47F 5/00* (2006.01)
(52) U.S. Cl. ............... 248/316.4; 248/346.04; 248/450; 248/346.07; 403/109.3; 403/108
(58) Field of Classification Search ............. 248/316.4, 248/346.04, 346.07, 448, 450; 379/455; 403/108, 109.3
See application file for complete search history.

(56) References Cited

U.S. PATENT DOCUMENTS

| | | | | |
|---|---|---|---|---|
| 5,457,745 A * | 10/1995 | Wang | ............... | 379/454 |
| 5,727,898 A * | 3/1998 | Lu | ............... | 403/325 |
| 5,788,202 A * | 8/1998 | Richter | ............... | 248/316.4 |
| 5,862,572 A * | 1/1999 | Lin et al. | ............... | 16/405 |
| 5,903,645 A * | 5/1999 | Tsay | ............... | 379/455 |
| 6,409,412 B1 * | 6/2002 | Huang | ............... | 403/109.3 |
| 7,272,984 B2 * | 9/2007 | Fan | ............... | 74/89.17 |
| D557,329 S * | 12/2007 | Lippert | ............... | D17/20 |
| 7,395,830 B2 * | 7/2008 | Seo | ............... | 135/140 |
| 7,537,190 B2 * | 5/2009 | Fan | ............... | 248/309.1 |
| 7,611,112 B2 * | 11/2009 | Lin | ............... | 248/274.1 |
| 7,647,676 B2 * | 1/2010 | Carnevali | ............... | 24/523 |
| 7,712,720 B1 * | 5/2010 | Cheng et al. | ............... | 248/346.07 |
| 7,828,259 B2 * | 11/2010 | Wang et al. | ............... | 248/316.4 |
| 7,913,963 B2 * | 3/2011 | Cheng et al. | ............... | 248/205.5 |
| 7,918,427 B2 * | 4/2011 | Wang | ............... | 248/278.1 |
| 7,967,269 B2 * | 6/2011 | Liu | ............... | 248/287.1 |
| 2003/0218113 A1 * | 11/2003 | Sullivan | ............... | 248/346.07 |
| 2005/0236536 A1 * | 10/2005 | Fan | ............... | 248/176.3 |
| 2006/0215836 A1 * | 9/2006 | Wang | ............... | 379/455 |
| 2006/0278788 A1 * | 12/2006 | Fan | ............... | 248/309.1 |
| 2007/0284500 A1 * | 12/2007 | Fan | ............... | 248/346.06 |

\* cited by examiner

*Primary Examiner* — Terrell McKinnon
*Assistant Examiner* — Daniel J Breslin
(74) *Attorney, Agent, or Firm* — Rosenberg, Klein & Lee

(57) ABSTRACT

An electronic device holder is revealed. By the electronic device holder, an electronic device is supported in a preset position so that users can operate the electronic device conveniently. The electronic device holder consists of holding units on tow sides thereof and a connection member connecting the two holding units. By the stopping and clipping of the two holding units, the electronic device is held and supported firmly in a preset state.

15 Claims, 14 Drawing Sheets

AUXILIARY SECURELY HOLDING DEVICE FOR ELECTRONIC APPLIANCE

BACKGROUND OF THE INVENTION

1. Fields of the Invention

The present invention relates to an electronic device holder, especially to an electronic device holder that secures and supports an electronic device in a preset position for convenient operation.

2. Descriptions of Related Art

Along with progress of modern technology, various kinds of electronic device have been developed and improved. For example, sparkling iPod®" in recent years or the hottest product available now-Tablet PC. The most popular one is Apple iPad®, about the size of a book. Besides displayed vertically, the iPad® screen will flip horizontally as soon as users rotate it 90 degrees with an internal accelerometer, just like iPhone®. And it's good for browsing the internet, checking and sending e-mails, listening to music, watching videos etc.

There is no need to hold the electronic device such as iPad® on the hand all the time, especially viewing videos or surfing internet for a long time. When the electronic device is set on a desk, the angle and the angle and position of the screen are unable to be adjusted. This cause trouble and inconvenience in use.

SUMMARY OF THE INVENTION

Therefore it is a primary object of the present invention to provide an electronic device holder that supports and holds an electronic device tightly so that users can operate the electronic device conveniently.

In order to achieve above objects, an electronic device holder mainly consists of a holding unit on each of two sides thereof and a connection member connected the two holding units. By the stopping and clipping of the two holding units, the electronic device is set in a preset position firmly and stably.

Moreover, each of the two holding units is disposed with a securing step. When the electronic device is laid on the two holding unit, it is secured by the securing steps of the two holding units.

A grip part for users to hold extends out of the outer side of each holding unit so as to provide convenient operation of the electronic device.

Each of the two holding units is disposed with an insertion slot. The standing electronic device is supported firmly by an edge thereof being mounted into the insertion slot and users can access the content displayed by the electronic device conveniently.

Furthermore, the connection member connecting the holding units on two sides includes at least two rod parts, each of which has one end sleeved with each other. A length adjustment unit is mounted between the two rod parts for changing the length that the two rod part extends outward and further modifying the distance between the two holding units.

In addition, a toggle unit is arranged between the holding units on two sides and the connection member so as to adjust the angle between the holding unit and the connection member. Thus the electronic device holder is folded and received.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
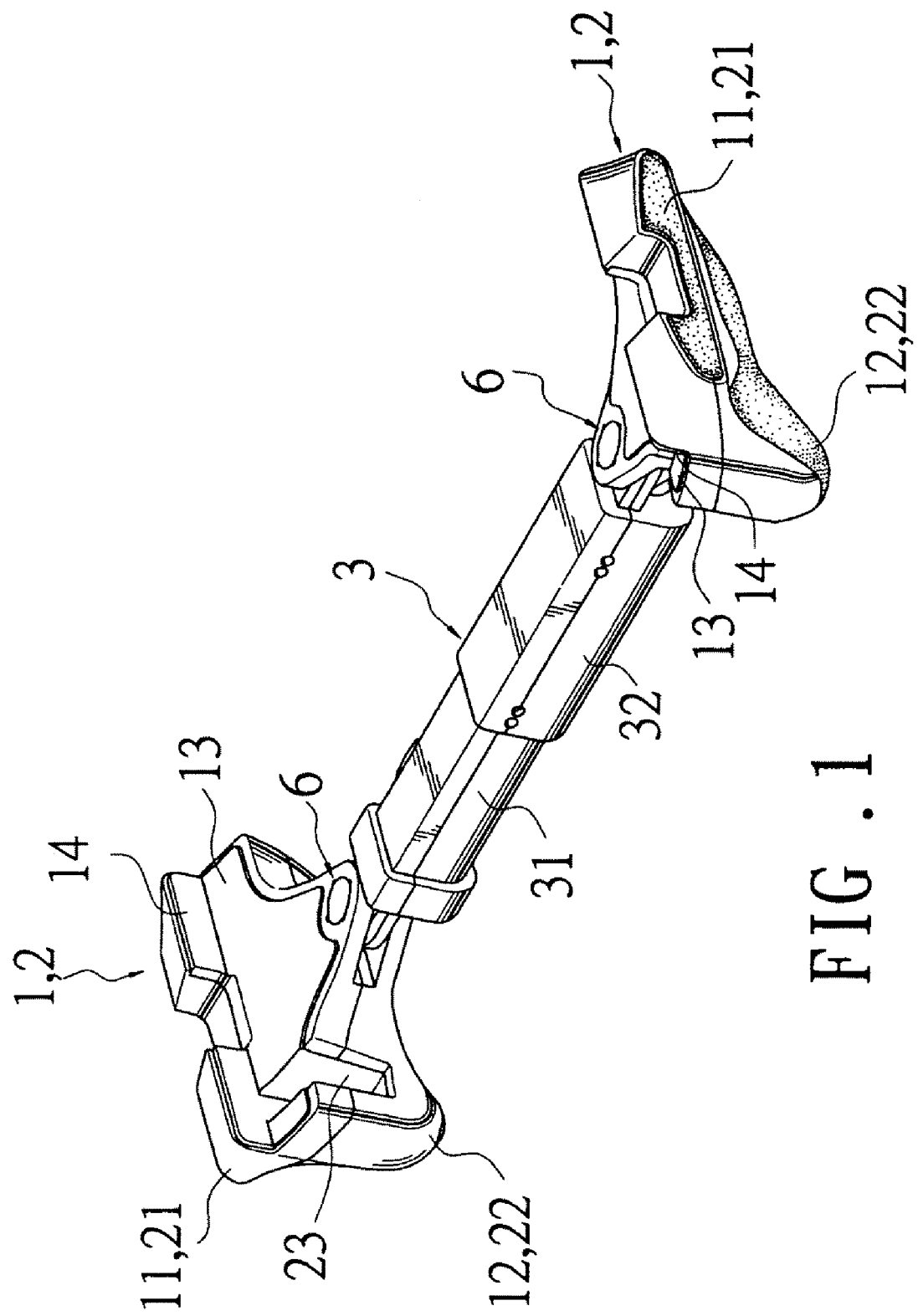
FIG. 1 is a perspective view of an embodiment of an electronic device holder according to the present invention.

Refer to FIG. 1, an electronic device holder of the present invention mainly consists of two holding units 1/2 respectively on each of two sides thereof and a connection member 3 connected the two holding units 1/2. By the stopping and holding of the two holding units 1/2, an electronic device 4 such as iPad® shown from FIG. 7 to FIG. 10 is secured and fixed firmly in a preset position.

A grip part 11/21 for users to grasp is arranged projectingly on an outer side of each holding unit 1/2 so as to provide convenient operation of the electronic device 4.

The electronic device holder further includes a support part 12/22 disposed projecting from a rear end on a bottom of the two holding units 1, 2 so as to make the electronic device holder slant and have a higher rear side and a lower front side. After the electronic device 4 being fit in the electronic device holder, there is a fitting angle that makes users operate the electronic device 4 easily.

Figure 7:
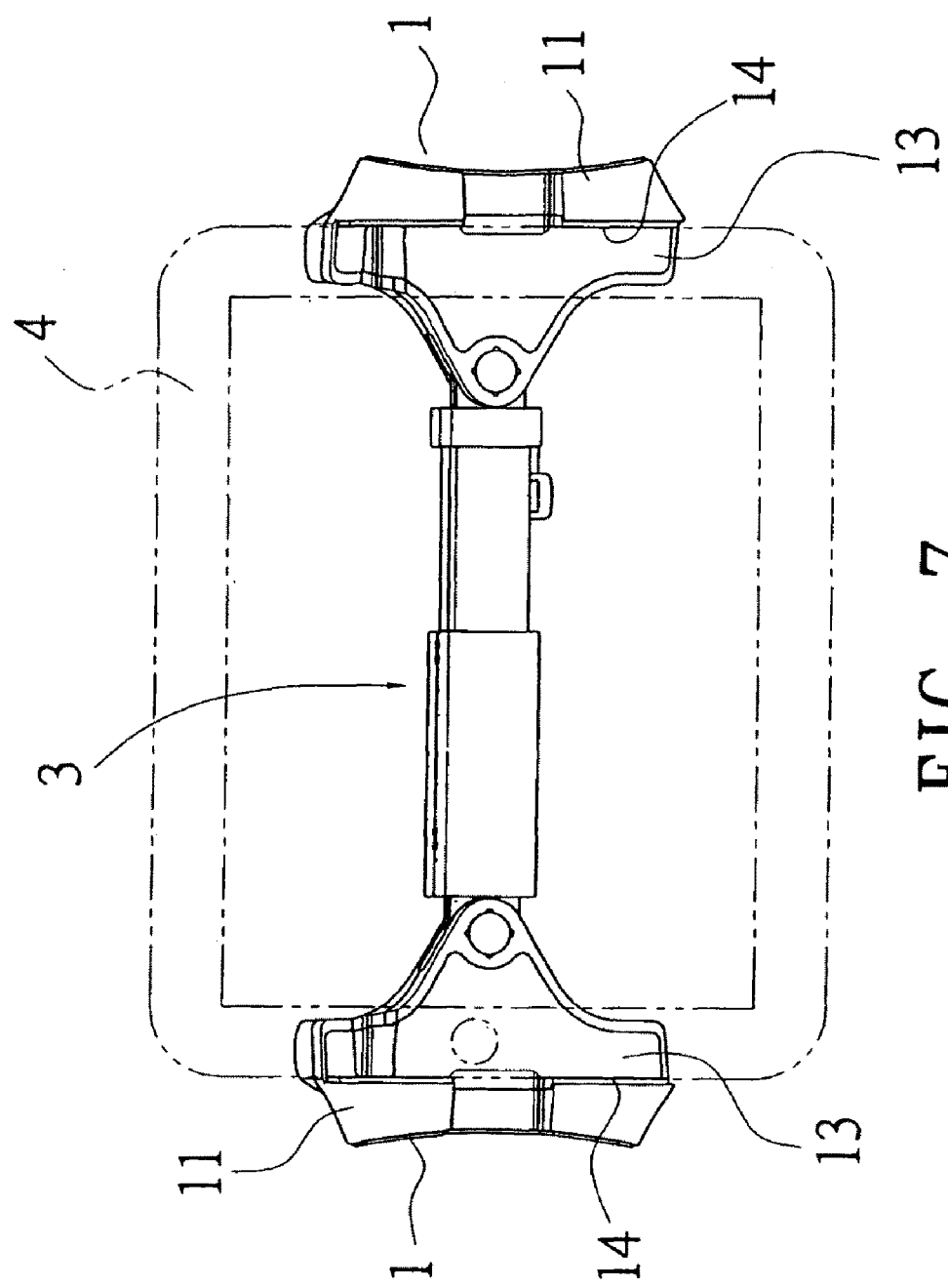
FIG. 7 is a schematic drawing showing a top view of an electronic device holder laid horizontally according to the present invention.
Figure 8:
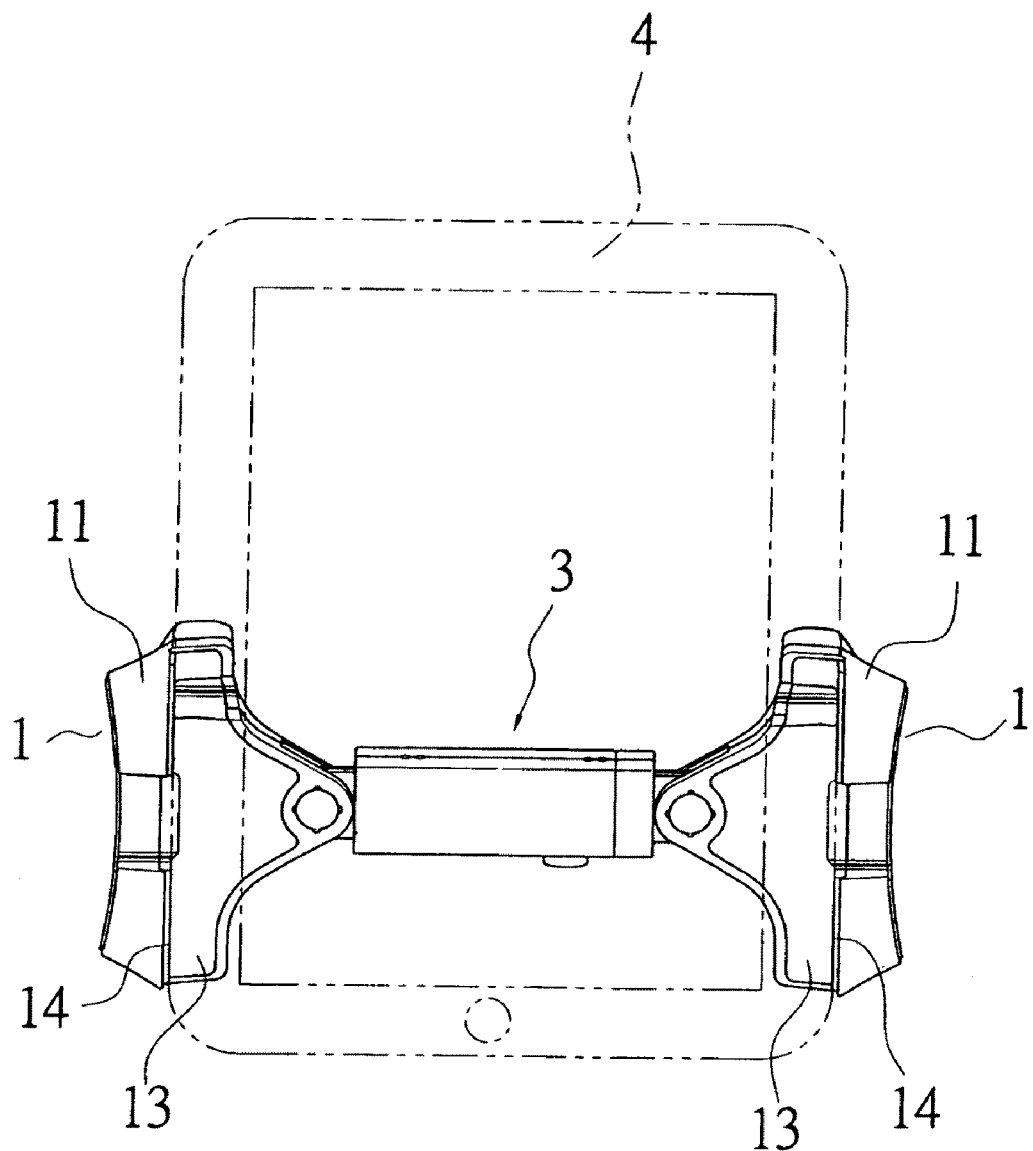
FIG. 8 is a schematic drawing showing a top view of an electronic device holder laid vertically according to the present invention.

Refer to FIG. 7 and FIG. 8, in an embodiment of the electronic device holder, a depressed area 13 is disposed on each of the two holding units 1. There is a height difference between the depressed area 13 and a top surface of the grip part 11 of the holding unit 1 so that a securing step 14 is formed. Thereby the electronic device 4 is laid between the depressed areas 13 of the two holding units 1 and the securing step 14 of the two holding units 1 attaches closely to each of two sides of the electronic device 4 so as to secure the electronic device 4 between the two holding units 1. Thus the electronic device 4 is used conveniently by users.

Figure 9:
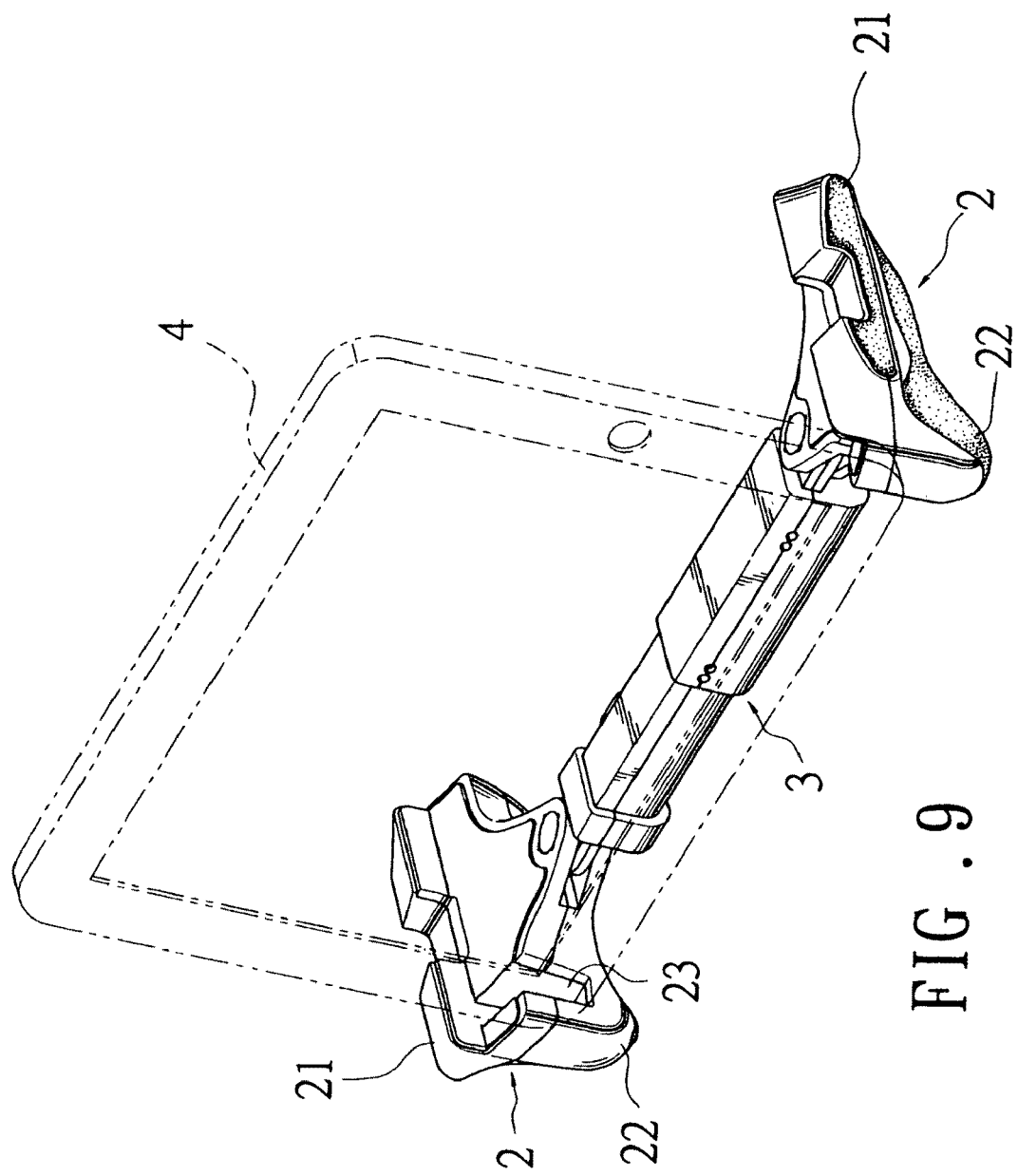
FIG. 9 is a schematic drawing showing an electronic device holder standing horizontally according to the present invention.
Figure 10:
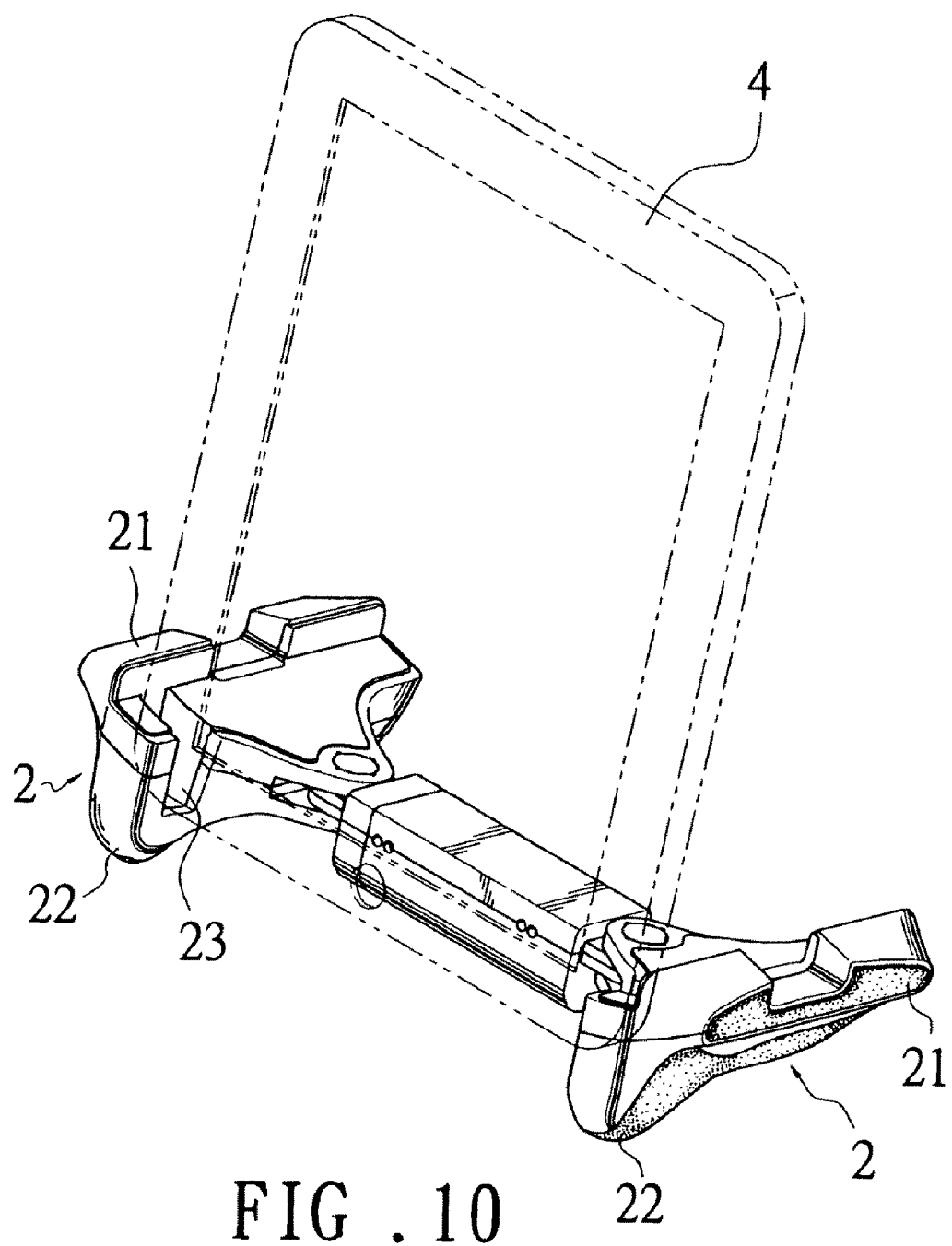
FIG. 10 is a schematic drawing showing an electronic device holder standing vertically according to the present invention.

Refer to FIG. 9 and FIG. 10, a further embodiment of the present invention is disclosed. Each of the two holding units 2 is arranged with an insertion slot 23. The edge of the electronic device 4 is mounted into the insertion slot 23 so that the electronic device 4 standing on the electronic device holder can be held tightly by the two holding units 2 and users can access the content displayed by the electronic device 4 comfortably.

Figure 2:
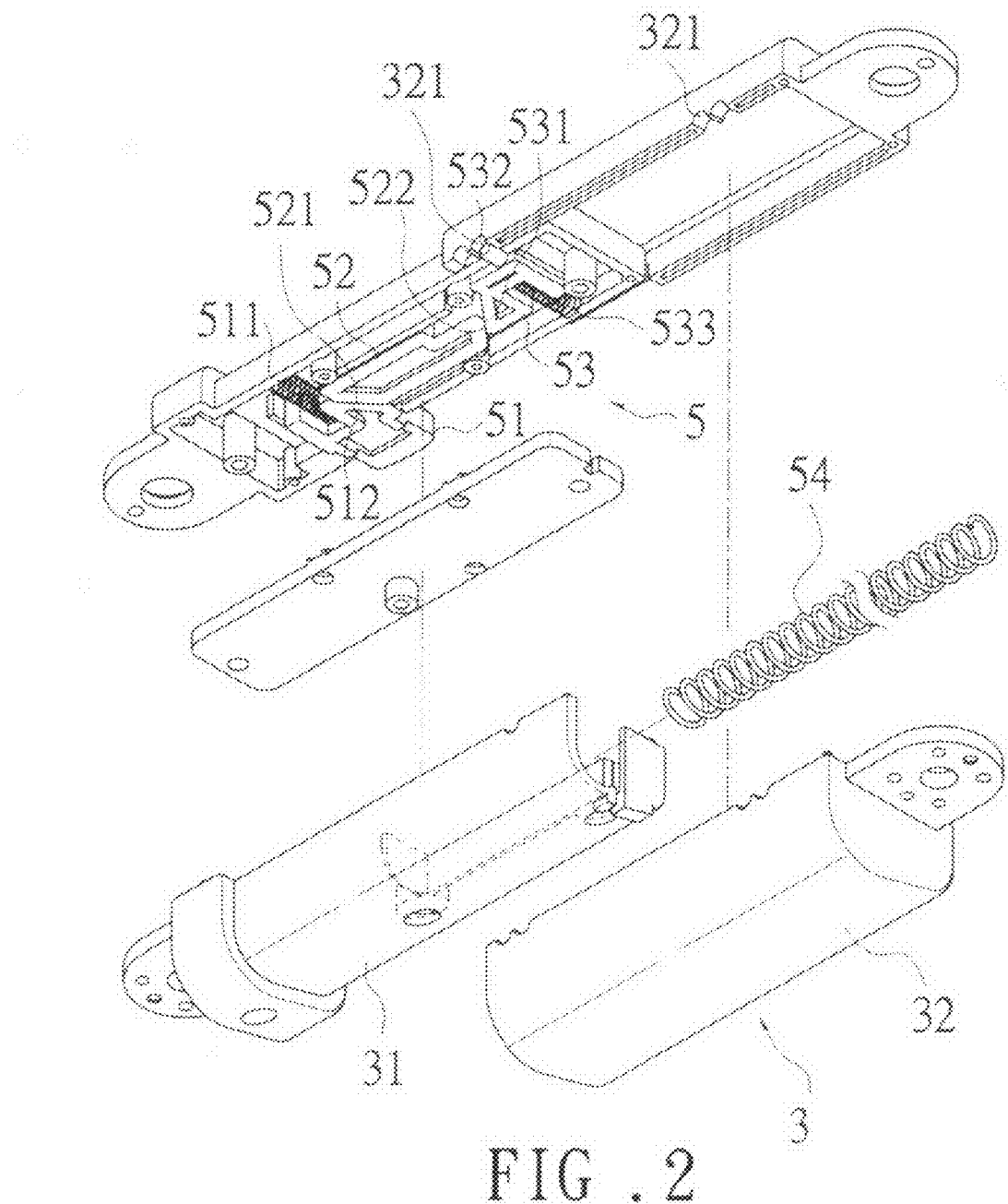
FIG. 2 is an explosive view of a connection member and a length adjustment unit of an embodiment according to the present invention.
Figure 3:
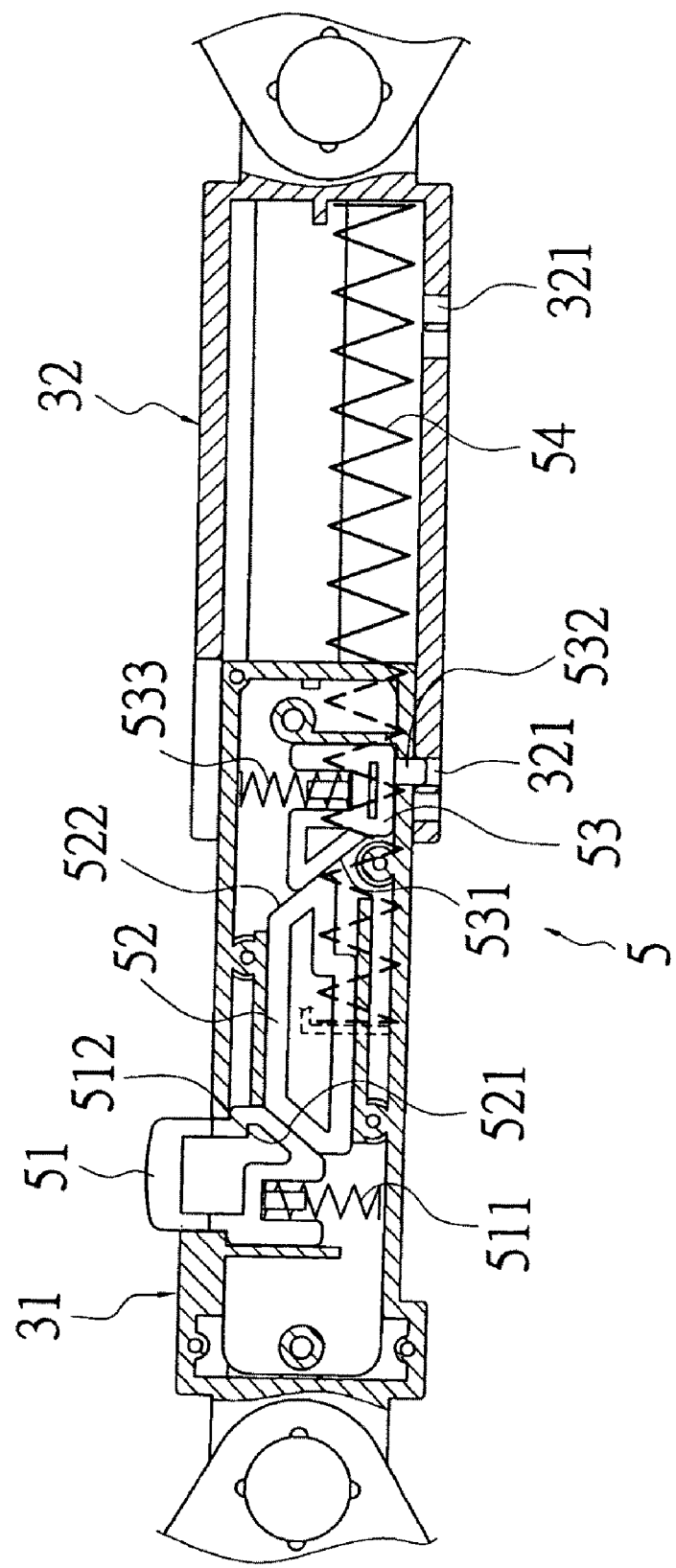
FIG. 3 is a top view of a connection member and a length adjustment unit of an embodiment according to the present invention.
Figure 4:
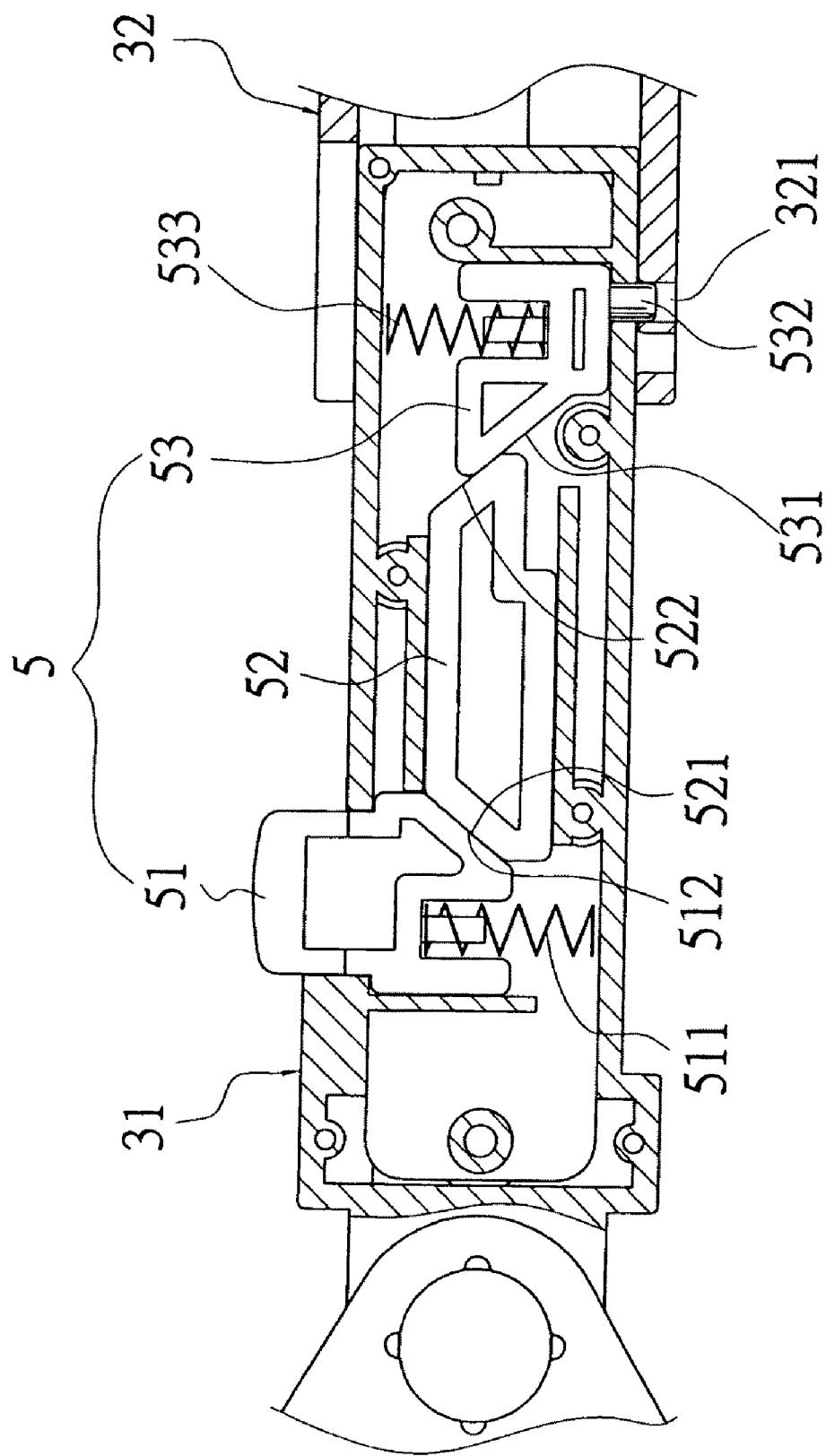
FIG. 4 is a partial enlarged view of the embodiment in FIG. 3.
Figure 5:
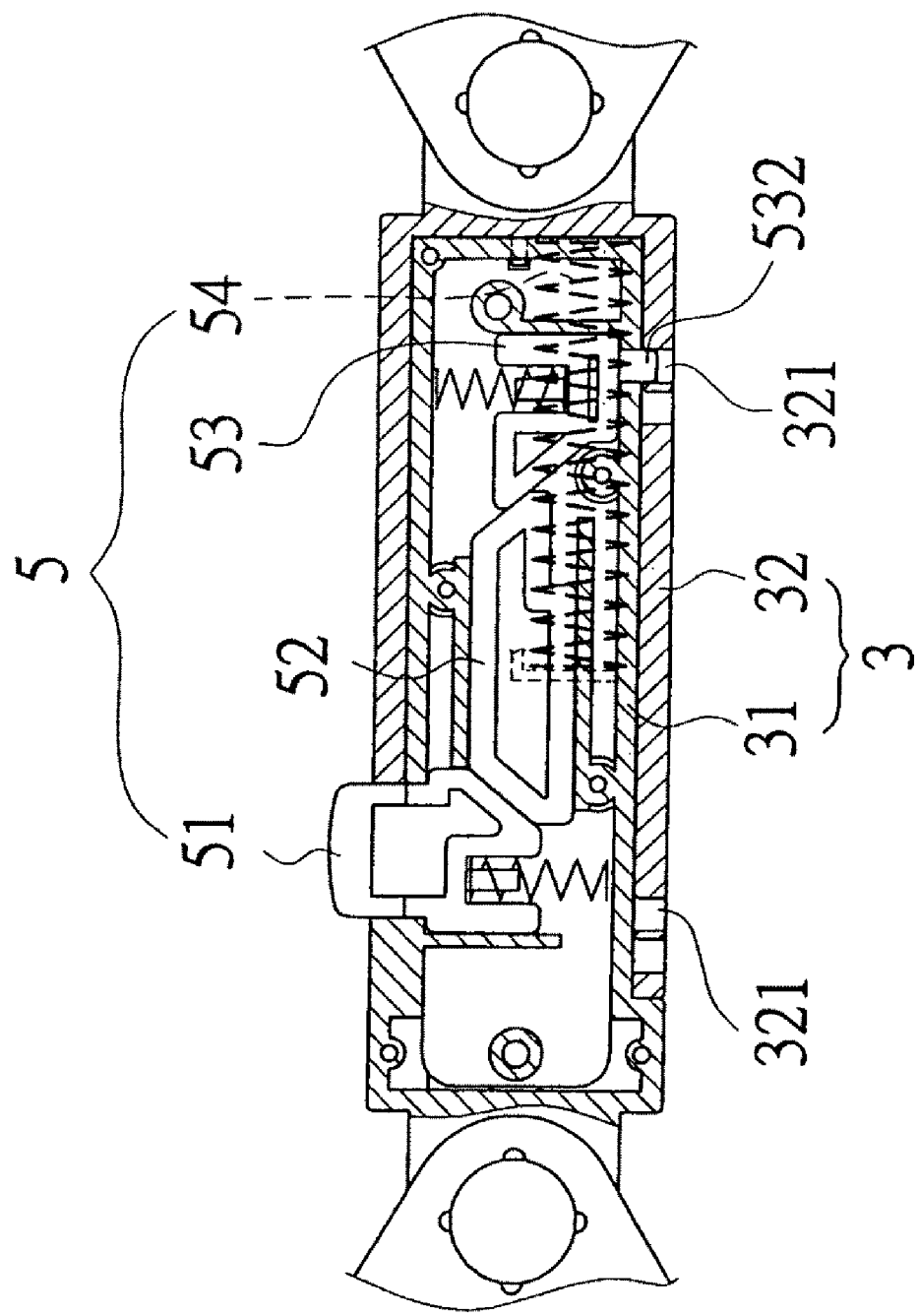
FIG. 5 is a top view of a connection member and a length adjustment unit of an embodiment while adjusting a distance according to the present invention.
Figure 6:
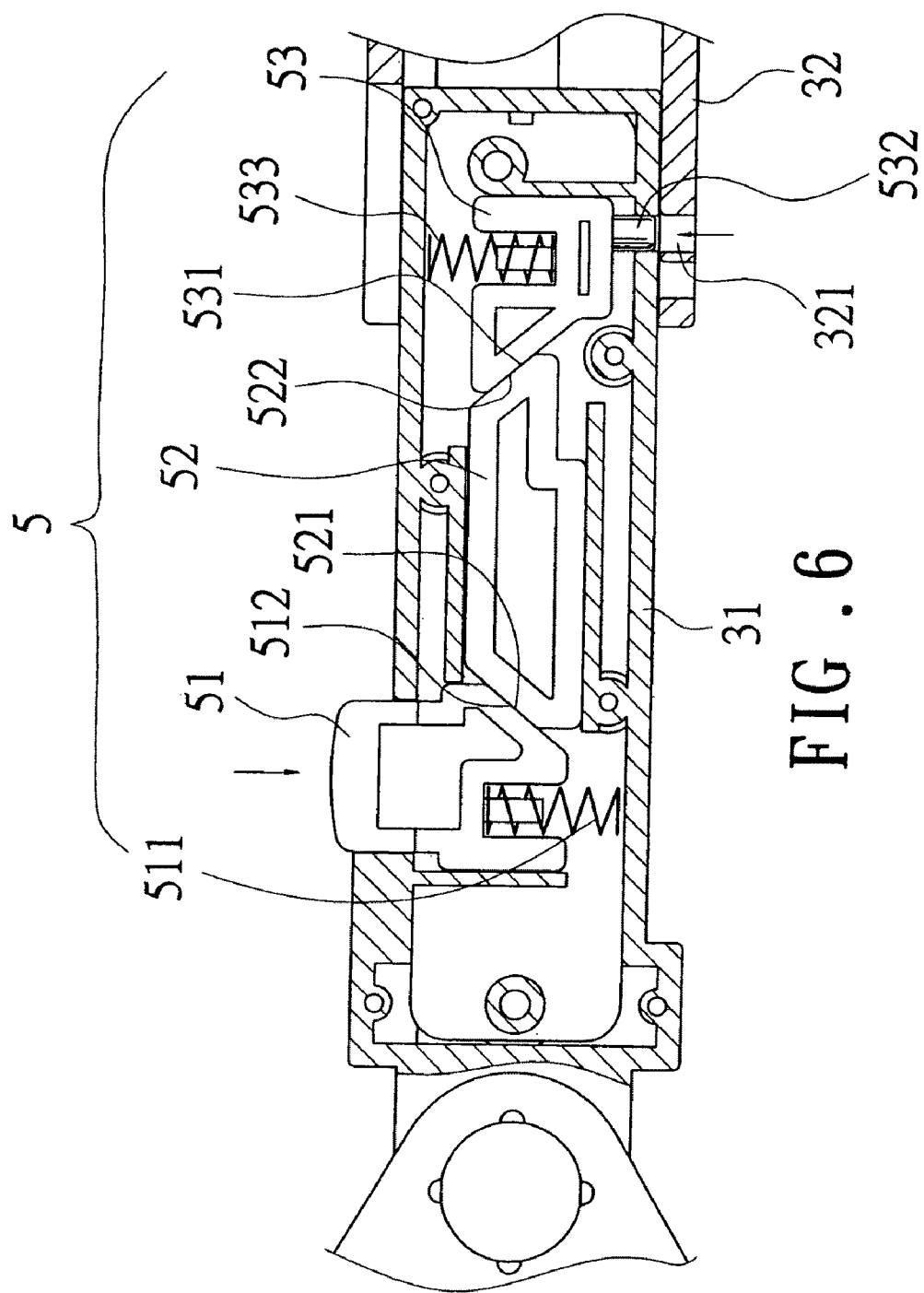
FIG. 6 is a partial enlarged view of the embodiment in FIG. 5.

In the above two embodiments, back to FIG. 1 and FIG. 2, the connection member 3 for connecting the holding units 1/2 on two sides includes a length adjustment unit 5 that changes the distance between the holding units 1/2 on two sides. No matter the size of the electronic device 4 is large or small, or the electronic device 4 is set vertically or horizontally, the holding units 1/2 on two sides of the device can hold or support the electronic device 4 firmly through the adjustment of the length adjustment unit 5, as shown from FIG. 7 to FIG. 10.

The connection member 3 for connecting the holding units 1/2 on two sides of the device in the above two embodiments further includes at least a first rod part 31 and a second rod part 32, each of which has one end sleeved with each other. The length adjustment unit 5 is mounted in a sleeved part which the first rod part 31 and the second rod part 32 sleeved with each other so as to change the distance the first rod part 31 sleeved with the second rod part 32 and further modifying the distance between the two holding units 1/2.

Refer from FIG. 2 to FIG. 6, the length adjustment unit 5 consists of a pressing part 51 that extends out of a tube wall of the first rod part 31 and has elasticity to be pressed, an auxiliary drive part 52 being pushed by the pressing part 51, and a location part 53 moved along with the auxiliary drive part 52 to be mounted into a tube wall of the second rod part 32. The pressing part 51 is disposed with a first elastic element 511 between the tube wall of the first rod part and the pressing part 51, along the pressed direction. The pressing part 51 also has a first slanting surface 512 on one side thereof, beside the auxiliary drive part 52. The auxiliary drive part 52 consists of a first leaning surface 521 arranged on one side, facing and corresponding to the first slanting surface 512 of the pressing part 51 and a second slanting surface 522 disposed on the other side thereof. The location part 53 is set with a second leaning surface 531 corresponding to the second slanting surface 522 of the auxiliary drive part 52, and a tenon 532 that extends out of the tube wall of the first rod part 31 to be locked with one of a plurality of locating holes 321 on the tube wall of the second rod part 32. Moreover, a second elastic element 533 is arranged one side of the location part 53, opposite to the between tenon 532, located between the tube wall of the first rod part 31 and the location part 53.

Thereby when the pressing part 51 is pressed and moved toward the first elastic element 511 to compress the first elastic element 511, the pressing part 51 pushes against the first leaning surface 521 of the auxiliary drive part 52 by the first slanting surface 512 because the first slanting surface 512 and the first leaning surface 521 are attached closely and moved together. Thus the auxiliary drive part 52 moves toward the side with the second slanting surface 522 thereof. The second leaning surface 531 of the location part 53 is corresponding to the second slanting surface 522 so that the second slanting surface 522 of the auxiliary drive part 52 presses against the location part 53 when the auxiliary drive part 52 moves toward the side with second slanting surface 522 thereof. Thus the tenon 532 of the location part 53 is released from the locating hole 321 of the second rod part 32 and the second elastic element 533 is compressed. Now the distance sleeved between the first rod part 31 and the second rod part 32 can be adjusted to a preset length. Then the pressing part 51 is released so that the pressing part 51 turns back to the original position (the position without being pressed) and the tenon 532 of the location part 53 is again locked into another locating hole 321 of the second rod part 32 due to the elastic recovery force of the first elastic element 511 and the elastic recovery force of the second elastic element 533 respectively. At the same time, the auxiliary drive part 52 is also moved and turning back to the original position. Thus the adjustment of the distance between the two holding units 1/2 is achieved.

In the above two embodiments, an elastic part 54 is arranged between the first rod part 31 and the second rod part 32. When the elastic part 54 is not compressed, the distance between the first and the second rod parts 31, 32 is the maximum after the first and the second rod parts 31, 32 being extended. When the elastic part 54 is compressed and the pressing part 51 is pressed for releasing the tenon 532 of the location part 53 from the locating hole 321 of the second rod part 32, the first and the second rod parts 31, 32 move and project outward by the elastic recovery force of the elastic part 54.

Figure 11:
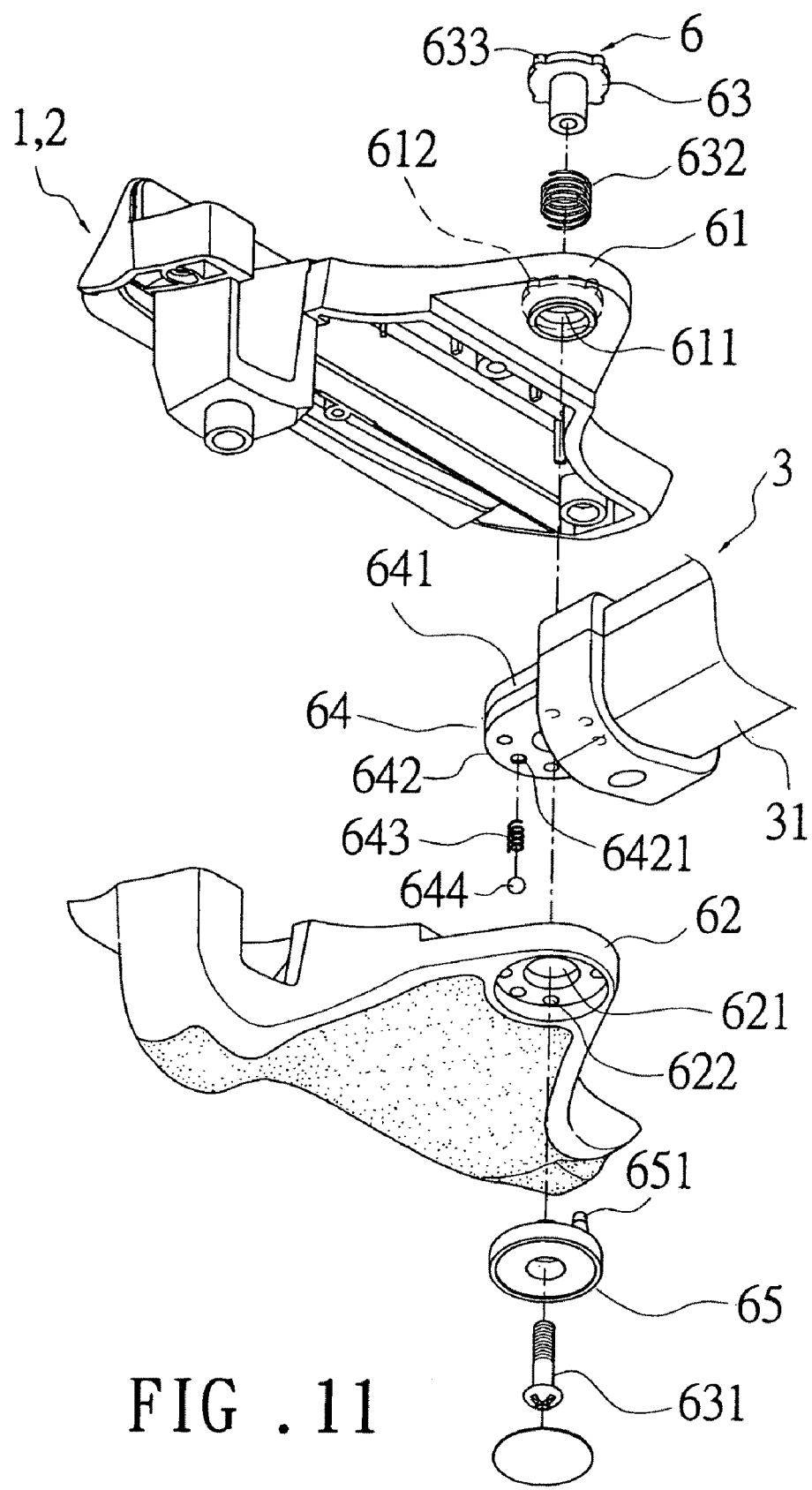
FIG. 11 is an explosive view of a toggle unit of an embodiment according to the present invention.

Refer to FIG. 1 and FIG. 11, a toggle unit 6 is disposed between the holding unit 1/2 on each of two sides and the first rod part 31 of the connection member 3 as well as between the holding unit 1/2 on each of two sides and the second rod part 32 of the connection member 3. By means of the toggle unit 6, the two holding units 1/2 can be folded and received inward to be in a folded state while not in use, as shown in FIG. 14.

Figure 12:
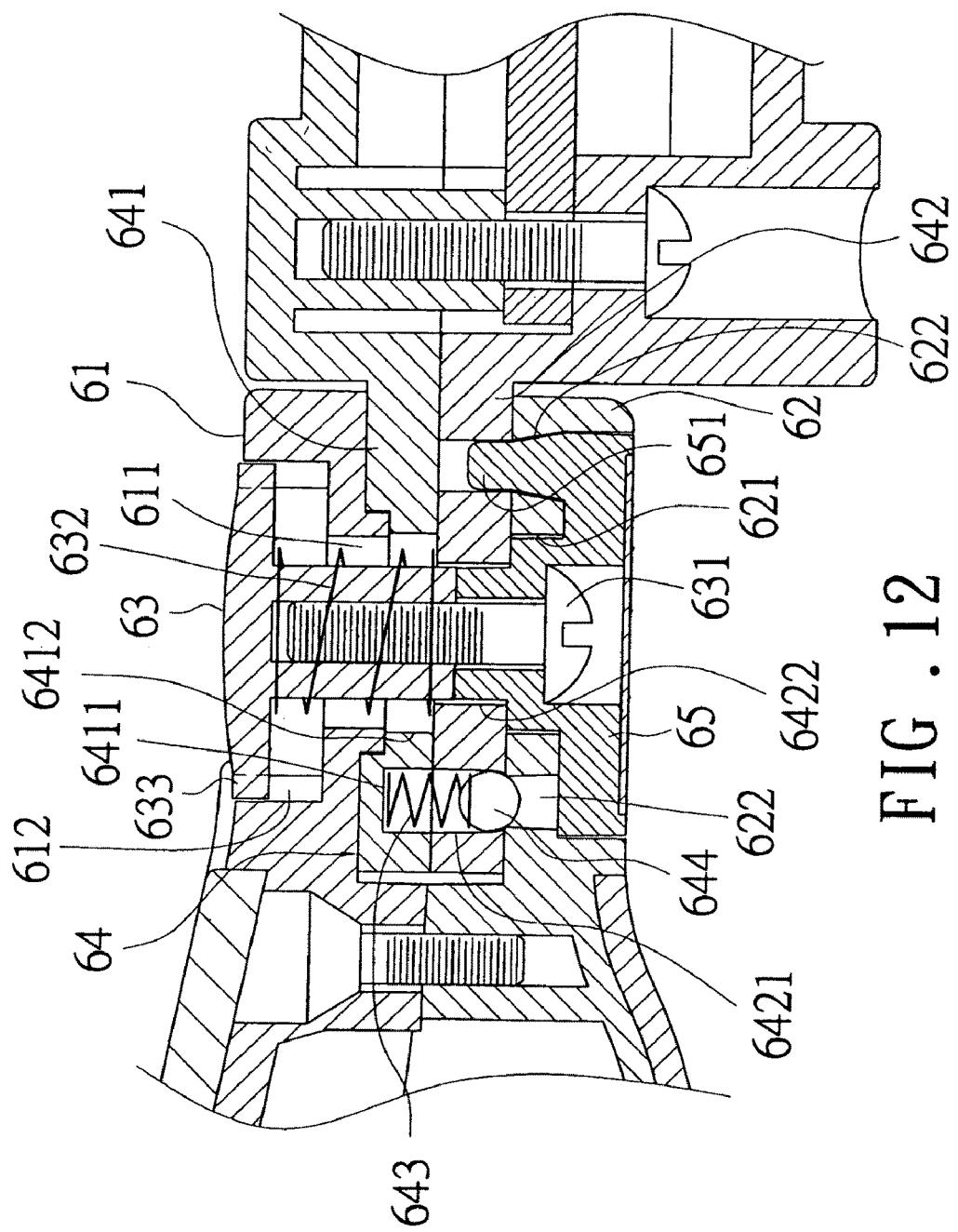
FIG. 12 is an assembled cross sectional view of a toggle unit of an embodiment according to the present invention.
Figure 13:
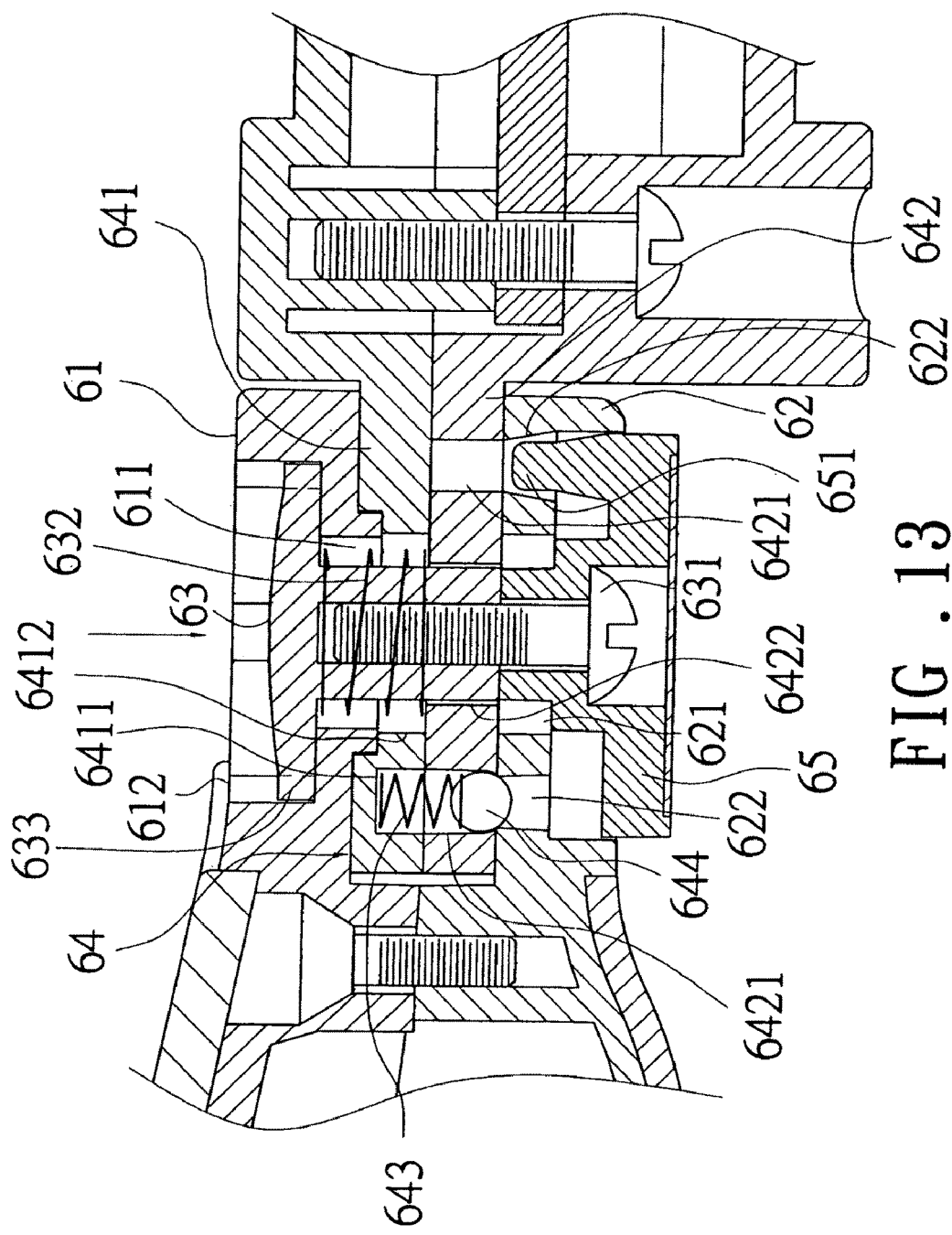
FIG. 13 is a schematic drawing showing a toggle unit when the pressing member is pressed according to the present invention.

Refer to FIG. 12 and FIG. 13, the toggle unit 6 includes an upper pivotal part 61, a lower pivotal part 62, a pressing member 63, a middle pivotal part 64 and a location member 65. The upper pivotal part 61 is disposed correspondingly to the lower pivotal part 62. The upper pivotal part 61 and the lower pivotal part 62 have a central hole 611, 621 respectively. A groove 612 is arranged around the central hole 611 of the upper pivotal part 61 and the lower pivotal part 62 is disposed with a plurality of insertion holes 622. The middle pivotal part 64 is set between the upper pivotal part 61 and the lower pivotal part 62 and is having two corresponding ring bodies 641, 642. The upper ring body 641 is disposed with a concave hole 6411 and the lower ring body 642 is mounted with a plurality of through holes 6421. One of the through holes 6421 is corresponding to the concave hole 6411 and a third elastic element 643 elastically pushing against a location part 644 is mounted in this concave hole 6411 and the corresponding through hole 6421. The front end of the location part 644 is extending out of the through hole 6421 a bit and is mounted in an end of one of the insertion holes 622 of the lower pivotal part 62. The two corresponding ring bodies 641, 642 respectively have a central hole 6412, 6422. The location member 65 includes an insertion pin 651 that is mounted in one of the insertion holes 622 of the lower pivotal part 62 and in one of the through holes 6421 of the lower ring body 642 without the location part 644 correspondingly. The pressing member 63 and the location member 65 respectively penetrate into the central hole 611 of the upper pivotal part 61 and the central hole 621 of the lower pivotal part 62, through the central holes 6412, 6422 of the two corresponding ring bodies 641, 642 of the middle pivotal part 64. A fastening part 631 inserts through the location member 65 to be fastened with the pressing member 63. A fourth elastic element 632 is set between the pressing member 63 and the location member 65 while the pressing part 63 is arranged with a convex part 633 corresponding to the groove 612 of the upper pivotal part 61 so that the pressing member 63 is radially located in the upper pivotal part 61 and is moved with radial rotation of the upper pivotal part 61. Thereby the toggle unit 6 is formed.

Furthermore, the upper pivotal part 61, the lower pivotal part 62, and the middle pivotal part 64 of the toggle unit 6 can be extended from the first rod part 31, the second rod part 32 or the holding unit 1/2.

Figure 14:
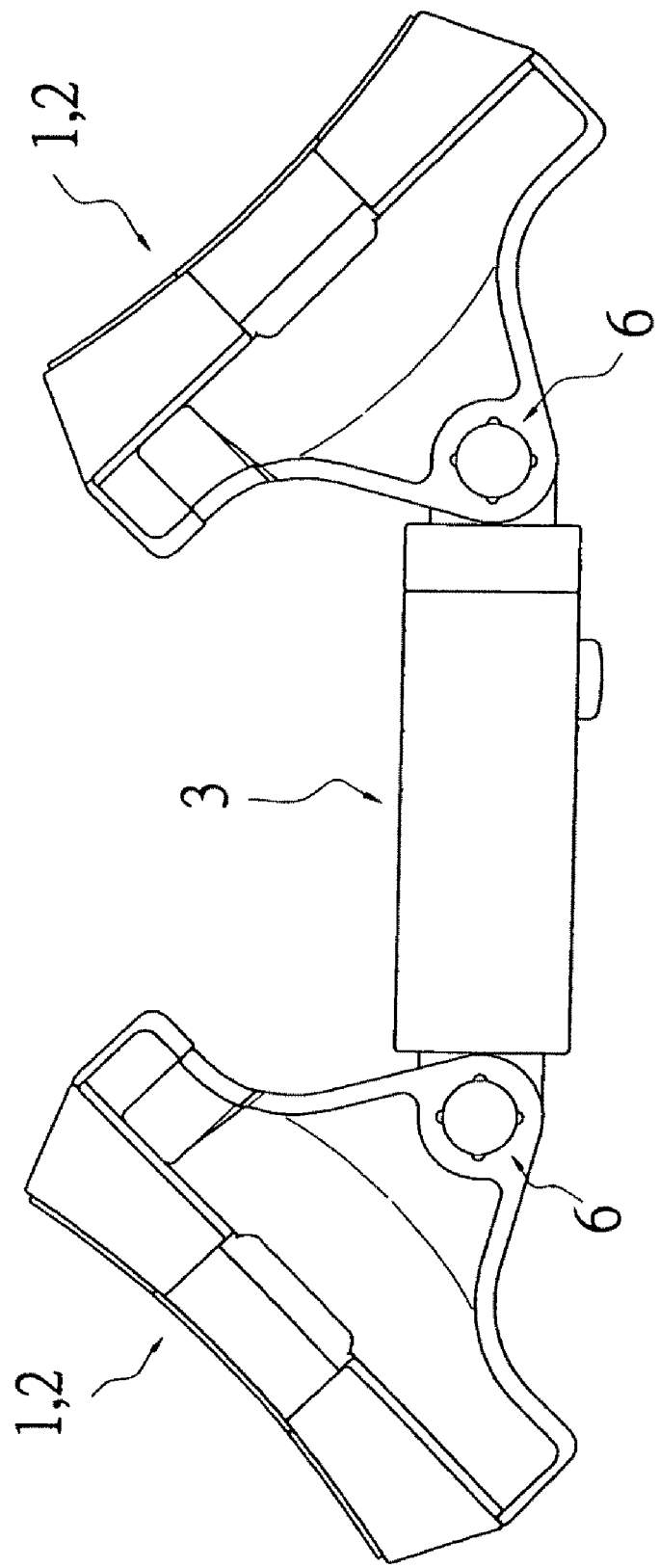
FIG. 14 is a schematic drawing showing a folded embodiment of an electronic device holder according to the present invention.

Refer to FIG. 13 and FIG. 14, while folding the holding unit 1/2 on two sides thereof, press the pressing member 63 so that the pressing member 63 pushes against the location member 65 and the insertion pin 651 of the location member 65 is released from the corresponding through hole 6421 of the lower ring body 642. Then the holding unit 1/2 can be rotated, folded and packed into a smaller size. Moreover, while rotating the holding unit 1/2, a multistage location effect is achieved through the location part 644 being pushed by the third elastic element 643 to be mounted in one of the insertion holes 622 of the lower pivotal part 62. After releasing the pressing member 63, the pressing member 63 is pulled back to the original position by the recovery force of the compressed fourth elastic element 632. Moving along with the pressing member 63, the e location member 65 also turns back to its original position and the insertion pin 651 of the location member 65 is again mounted into the corresponding through hole 6421 of the lower ring body 642 so as to fix the folded holding unit 1/2.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic device holder comprising:
   a holding unit disposed on each of two sides thereof, and a connection member that connects the two holding units; an electronic device is held tightly and stably by stopping and clipping of the two holding units;
   wherein a depressed area is arranged at each of the two holding units so as to form a securing step due to a height difference between the depressed area and a top surface of the holding unit;
   the connection member that connects the two holding units on two sides includes a length adjustment unit for changing distance between the two holding units;
   the connection member includes at least a first rod part and a second rod part, each of which has one end sleeved with each other while the length adjustment unit is disposed within the first rod part and the second rod part;
   the length adjustment unit includes a pressing part that extends out of a tube wall of the first rod part and has elasticity to be pressed, an auxiliary drive part being pushed by the pressing part, and a location part moved along with the auxiliary drive part to be mounted into a tube wall of the second rod part, and an elastic part arranged between the first rod part and the second rod part; the pressing part having a first elastic element disposed between the tube wall of the first rod part and the pressing part and along the pressed direction, a first slanting surface on one side thereof and facing the auxiliary drive part; the auxiliary drive part includes a first leaning surface arranged on one side and corresponding to the first slanting surface of the pressing part and a second slanting surface disposed on the other side thereof; the location part includes a second leaning surface corresponding to the second slanting surface of the auxiliary drive part, a tenon that extends out of the tube wall of the first rod part to be locked with one of a plurality of locating holes on the tube wall of the second rod part, and a second elastic element arranged at one side of the location part opposite to the tenon and located between the tube wall of the first rod part and the location part; and when the elastic part arranged between the first rod part and the second rod part is not compressed, distance between the first rod part and the second rod part is the maximum after the first rod part and the second rod part being extended.

2. The device as claimed in claim 1, wherein a toggle unit is arranged between each of the holding units and the connection member.

3. The device as claimed in claim 2, wherein the toggle unit includes an upper pivotal part, a lower pivotal part, a pressing member, a middle pivotal part and a location member; the upper pivotal part and the lower pivotal part are disposed corresponding to each other and respectively having a central hole; a groove is arranged around the central hole of the upper pivotal part while the lower pivotal part is disposed with a plurality of insertion holes; the middle pivotal part is set between the upper pivotal part and the lower pivotal part, and having two ring bodies arranged vertically and correspondingly in which the ring body above is disposed with a concave hole while the ring body under is mounted with a plurality of through holes; one of the through holes is corresponding to the concave hole and a third elastic element elastically pushing against a location part is mounted in the concave hole and the corresponding through hole; a front end of the location part is extending out of the through hole a small amount and is mounted in an end of one of the insertion holes of the lower pivotal part; the two ring bodies respectively having a central hole; the location member includes an insertion pin that is mounted in one of the insertion holes of the lower pivotal part and in one of the through holes of the ring body under without the location part; the pressing member and the location member respectively penetrate into the central hole of the upper pivotal part and the central hole of the lower pivotal part correspondingly, through the central holes of the two ring bodies of the middle pivotal part; a fastening part is penetrating through the location member to be fastened with the pressing member and a fourth elastic element is set between the pressing member and the location member.

4. The device as claimed in claim 3, wherein a convex part corresponding to the groove of the upper pivotal part is disposed around the pressing part so that the pressing member is radially located in the upper pivotal part and is moved with radial rotation of the upper pivotal part.

5. The device as claimed in claim 4, wherein the upper pivotal part, the lower pivotal part, and the middle pivotal part of the toggle unit are extended from the first rod part, the second rod part or the holding unit adjacent to and connected thereof.

6. The device as claimed in claim 1, wherein each of the two holding units is disposed with an insertion slot for mounting an edge of the electronic device.

7. The device as claimed in claim 6, wherein the connection member that connects the two holding units on two sides includes a length adjustment unit for changing distance between the two holding units.

8. The device as claimed in claim 7, wherein the connection member includes at least a first rod part and a second rod part, each of which has one end sleeved with each other while the length adjustment unit is disposed between the first rod part and the second rod part.

9. The device as claimed in claim 8, wherein the length adjustment unit includes a pressing part that extends out of a tube wall of the first rod part and has elasticity to be pressed, an auxiliary drive part being pushed by the pressing part, and a location part moved along with the auxiliary drive part to be mounted into a tube wall of the second rod part, and an elastic part arranged between the first rod part and the second rod part; the pressing part having a first elastic element disposed between the tube wall of the first rod part and the pressing part and along the pressed direction, a first slanting surface on one side thereof and facing the auxiliary drive part; the auxiliary drive part includes a first leaning surface arranged on one side and corresponding to the first slanting surface of the pressing part and a second slanting surface disposed on the other side thereof; the location part includes a second leaning surface corresponding to the second slanting surface of the auxiliary drive part, a tenon that extends out of the tube wall of the first rod part to be locked with one of a plurality of locating holes on the tube wall of the second rod part, and a second elastic element arranged at one side of the location part opposite to the tenon and located between the tube wall of the first rod part and the location part.

10. The device as claimed in claim 9, wherein when the elastic part arranged between the first rod part and the second rod part is not compressed, distance between the first rod part and the second rod part is the maximum after the first rod part and the second rod part being extended.

11. The device as claimed in claim 9, wherein a toggle unit is arranged between each of the holding units and the connection member.

12. The device as claimed in claim 11, wherein the toggle unit includes an upper pivotal part, a lower pivotal part, a pressing member, a middle pivotal part and a location member; the upper pivotal part and the lower pivotal part are disposed corresponding to each other and respectively having a central hole; the lower pivotal part is disposed with a plurality of insertion holes; the middle pivotal part is set between the upper pivotal part and the lower pivotal part, and having two ring bodies arranged vertically and correspondingly in which the ring body above is disposed with a concave hole while the ring body under is mounted with a plurality of through holes; one of the through holes is corresponding to the concave hole and a third elastic element elastically pushing against a location part is mounted in the concave hole and the corresponding through hole; a front end of the location part is extending out of the through hole a small amount and is mounted in an end of one of the insertion holes of the lower pivotal part; the two ring bodies respectively having a central hole; the location member includes an insertion pin that is mounted in one of the insertion holes of the lower pivotal part and in one of the through holes of the ring body under without the location part; the pressing member and the location member respectively penetrate into the central hole of the upper pivotal part and the central hole of the lower pivotal part correspondingly, through the central holes of the two ring bodies of the middle pivotal part; a fastening part is penetrating through the location member to be fastened with the pressing member and a fourth elastic element is set between the pressing member and the location member.

13. The device as claimed in claim 12, wherein a convex part corresponding to the groove of the upper pivotal part is disposed around the pressing part so that the pressing member is radially located in the upper pivotal part and is moved with radial rotation of the upper pivotal part.

14. The device as claimed in claim 13, wherein the upper pivotal part, the lower pivotal part, and the middle pivotal part of the toggle unit are extended from the first rod part, the second rod part or the holding unit adjacent to and connected thereof.

15. The device as claimed in claim 1, wherein a grip part is arranged projectingly on an outer side of each of the two holding units and a support part is disposed projecting from a rear end on a bottom of each of the two holding units so as to make the electronic device holder slant and have a higher rear side and a lower front side.

* * * * *